United States Patent [19]

Stec et al.

[11] Patent Number: 5,268,750

[45] Date of Patent: Dec. 7, 1993

[54] APPARATUS FOR ADJUSTING THE TIMING OF SAMPLED DATA SIGNALS IN A RESAMPLING SYSTEM

[75] Inventors: Kevin J. Stec, Medford; Kenneth E. Vavreck, Maple Shade; Jerome D. Shields, Atco, all of N.J.

[73] Assignee: Panasonic Technologies, Inc., Secaucus, N.J.

[21] Appl. No.: 861,251

[22] Filed: Mar. 31, 1992

[51] Int. Cl.⁵ .......................................... H04N 11/20
[52] U.S. Cl. ......................................... 358/11; 358/19; 358/138; 364/724.16
[58] Field of Search .................. 358/138, 148, 158, 17, 358/19, 140, 11, 12; 364/724.16; 375/14

[56] References Cited

U.S. PATENT DOCUMENTS

| | | | |
|---|---|---|---|
| 4,148,059 | 4/1979 | Dillon et al. ............................. | 358/37 |
| 4,369,499 | 1/1983 | Northam .......................... | 364/724.16 |
| 4,471,381 | 9/1984 | Kasuga et al. ....................... | 358/140 |
| 4,602,285 | 7/1986 | Beaulier et al. ............. | 364/724.16 X |
| 4,870,661 | 9/1989 | Yamada et al. ..................... | 358/11 X |
| 4,953,026 | 8/1990 | Kobayashi et al. .................. | 358/167 |
| 5,027,423 | 6/1991 | Kawata et al. .............. | 364/724.16 X |
| 5,057,911 | 10/1991 | Stec et al. .............................. | 358/11 |
| 5,111,417 | 5/1992 | Belloc et al. ................ | 364/724.16 X |
| 5,119,176 | 6/1992 | Stec et al. .............................. | 358/11 |
| 5,153,846 | 10/1992 | Rao ................................... | 364/724.16 |
| 5,159,339 | 10/1992 | Fujita .................................. | 358/11 X |

OTHER PUBLICATIONS

Preliminary Product Specification for DIDIF12-40G, DIDIF12-40MQ integrated circuits, Dual Input Digital Interpolation Filter, Panasonic Technologies, Inc.: 1991.

Primary Examiner—Victor R. Kostak
Attorney, Agent, or Firm—Ratner & Prestia

[57] ABSTRACT

A video signal processing system uses a sequence of interpolation filters to resample a 125M video signal to produce a 244M signal. In addition, the system allows an operator to specify a desired subcarrier-to-horizontal sync (SCH) phase and a desired horizontal position. The system automatically adjusts the starting point in the sequence of filters used for the resampling operation to implement each of the requested phase shifts.

10 Claims, 5 Drawing Sheets

APPARATUS FOR ADJUSTING THE TIMING OF SAMPLED DATA SIGNALS IN A RESAMPLING SYSTEM

BACKGROUND OF THE INVENTION

The present invention concerns apparatus for making timing adjustments to sampled data signals which have been resampled, in particular, to apparatus for implementing subcarrier-to-horizontal (SCH) and video-to-horizontal timing adjustments in a digital video signal resampling system.

An international standard (known as SMPTE 125M) is currently being developed under the auspices of the Society of Motion Picture and Television Engineers (SMPTE). This standard for representing component video signals is derived from the CCIR601 standard developed by the International Consultative Committee for Radio-communications (CCIR). Under these standards, video information is represented by luminance (Y) and chrominance (C) components. The luminance signal which represents image brightness has a sample rate of 13.5 MHz, while the chrominance component consists of two interleaved color-difference signals, CR and CB, each of which have a sampling rate of 6.75 MHz. Under the 125M standard, samples of the luminance signal are multiplexed with samples of the two color-difference signals to form a sequence Y, CR, Y, CB, Y, CR . . . . This multiplexed signal has a sampling rate of 27 MHz.

The SMPTE 244M signal standard for North America is a digitized version of the NTSC video signal standard. This signal has a sample rate of 14.31818 (hereinafter 14.3) MHz and represents a base band composite video signal having a luminance signal component and two color-difference signal components which modulate respective quadrature-phase related subcarrier signals.

A system which converts 125M signals to 244M signals is described in U.S. Pat. No. 5,057,911 entitled, SYSTEM AND METHOD FOR CONVERSION OF DIGITAL VIDEO SIGNALS, which is hereby incorporated by reference for its teachings on video signal conversion. The system described in this patent uses a single interpolation filter to resample the luminance and chrominance components signals, to modulate the chrominance subcarrier signal by the chrominance signals and to combine the modulated chrominance signal with the luminance signal to generate the 244M composite video signal.

The first step in this conversion process is to demultiplex the 125M signal to generate separate Y and C component signals, where the C signal consists of interleaved samples of the CR and CB signals.

The demultiplexed Y signal has a sample rate of 13.5 MHz while the composite 224M signal has a sample rate of 14.3 MHz. Thus, for every 33 samples of the 125M Y signal, there are 35 samples of the 244M signal. The 125M C signals have a sampling rate of 6.75 MHz. Thus, for every 33 125M component chrominance sample sets (CR, CB) there are 70 244M composite samples. The system disclosed in the above-referenced patent resamples the component 125M signals to produce the composite 244M signal by using 35 interpolation filters for the signal Y, and 70 interpolation filters for the signal C. The 35 Y interpolation filters define 35 interstitial sample positions in the 125M Y sample interval while the 70 C interpolation filters define 35 interstitial sample positions between successive ones of the CR and CB samples, respectively. These filters are applied in a predetermined sequence to convert 66 samples of the 125M signal (66 Y and 33 CR,CB pairs) into 70 samples of the Y and C component signals which are then combined to form the 244M composite signal.

In addition to the 125M and 244M signals, a typical U.S. television studio will have signals from many other sources. At present, these are mainly analog NTSC signals. It is a common practice in producing programming to switch between signal sources during a broadcast. The most common form of switching is between programs and advertisements; however, even within a program, it may be desirable to switch, for example, from a camera source to a computer graphics generator or even to mix computer graphics and live video in a single image.

Due to the tight regulatory requirements for broadcast television signals, it is desirable for signals from various sources to be closely synchronized. Furthermore, color errors can occur if there is a difference in the relative phases of the horizontal sync pulse and the color-burst signal between two video signals which are either switched or mixed. In addition, if signals from two sources are not horizontally aligned so that one signal produces an image with a different center position than the other image, the resulting horizontal shift which occurs when the images are switched is seen as an annoying artifact by the viewer.

With analog signal sources, these adjustments are made by inserting the horizontal synchronization signal into the signal produced by the camera at a desired time relative to the start of the active video portion of the signal. While this same type of adjustment may be made in a digital system, delay adjustments in existing equipment have generally been limited to multiples of a single digital sample.

SUMMARY OF THE INVENTION

The present invention is embodied in a system which includes a plurality of interpolation filters that are used to resample a signal. The filters are used in a predetermined sequence to perform a desired resampling function. The system is responsive to a time shift signal to change the starting point in the sequence to achieve a time shift of less than one sample interval.

According to another aspect of the invention, a portion of the time shift which is a multiple of whole sample intervals is handled by advancing or delaying the sample stream in response to a shift-control signal.

In another aspect of the invention, the sampled data signal is a television signal which is adjusted in phase to achieve a desired subcarrier-to-horizontal (SCH) phase by selectively changing the starting phase in the interpolation sequence between the end of active video and the horizontal sync pulse.

In yet another aspect of the invention, variable horizontal positioning of the video image is achieved by changing the starting phase of the interpolation filters between the occurrence of the horizontal sync pulse and the start of active video.

DETAILED DESCRIPTION

Figure 1:
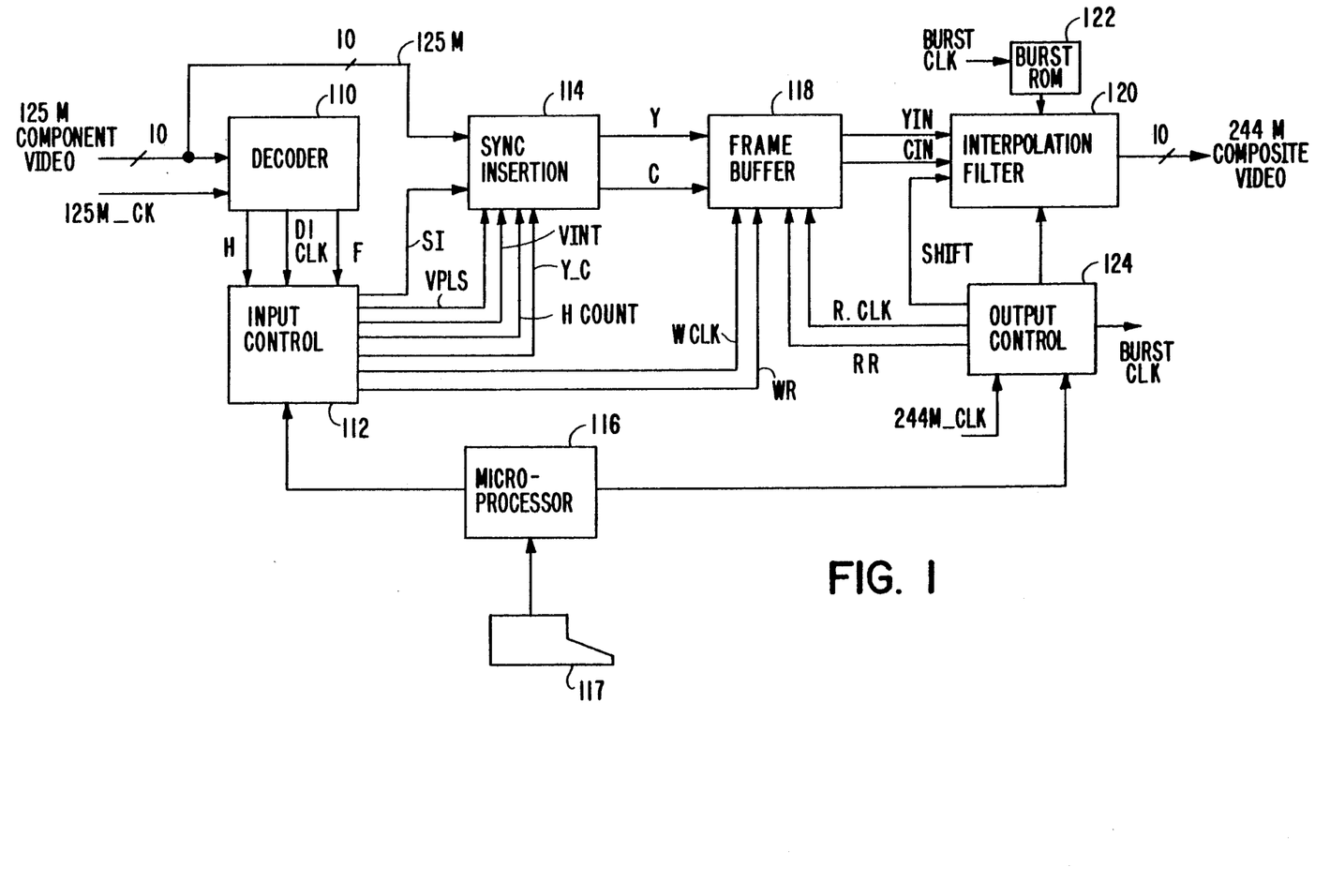
FIG. 1 is a block diagram of a resampling and phase adjustment system which includes an embodiment of the present invention.

The system shown in FIG. 1 converts a time-division multiplexed (TDM) 125M component video signal into a digital sampled data 244M composite video signal. The system resamples the 125M component signal using an interpolation filter of the type described in the above-referenced U.S. Patent in order to translate the 125M component signals, which have an effective sampling rate of 13.5 MHz, into 244M signals which have an effective sampling rate of 14.3 MHz. In addition to resampling the input 125M signal to produce the output 244M signal, the system shown in FIG. 1 controls the sequence in which the interpolation filters are used in order to perform selective subpixel phase adjustments of the output 244M signal.

In the exemplary embodiment of the invention, these phase adjustments are used to implement a programmable subcarrier-to-horizontal (SCH) phase adjustment and to implement programmable horizontal positioning of the resulting 244M video image. It is contemplated, however, that this invention may have general application wherever phase shifting of a resampled signal is desirable.

In addition, it is contemplated that an interpolation filter of the type described above in the referenced U.S. Patent may be used to perform SCH and horizontal position adjustments even when video signals do not need to be converted from one sampling rate to another.

In the system shown in FIG. 1, a ten-bit TDM 125M video signal having a sample rate of 27 MHz is applied to a 125M decoder 110 along with an accompanying 27 MHz clock signal CLK_27. Under the proposed 125M standard, this ten-bit signal includes alternating ten-bit samples of luminance and chrominance (i.e. the two color-difference signals CR and CB). The 125M decoder 110 extracts a horizontal line blanking signal H and a vertical field blanking signal F from the ten-bit samples and applies these two signals and the 27 MHz clock signal to input control logic 112.

The input control logic 112 includes a pair of counters (not shown) and a frequency-divide-by-two network (not shown). The logic 112 divides the clock signal CLK_27 in frequency by 2 to produce a 13.5 MHz clock signal Y_C. In addition, the control logic 112 provides a 10-bit signal HCOUNT which indicates the current horizontal pixel position of the 125M pixel value. The control logic 112 also provides two signals, VPLS and VINT which indicate, respectively, when a vertical synchronization pulse is to occur and when the vertical blanking interval is to occur. The control logic 112 also generates a signal SI which determines when synchronization samples are to be inserted into the 125M sample stream.

In addition to being applied to the 125M decoder 110, the ten-bit TDM video signal, representing the luminance and chrominance signal components, are applied to sync insertion circuitry 114. The input control logic 112 provides the signals SI, Y_C, HCOUNT, VPLS and VINT to the circuitry 114.

Figure 1A:
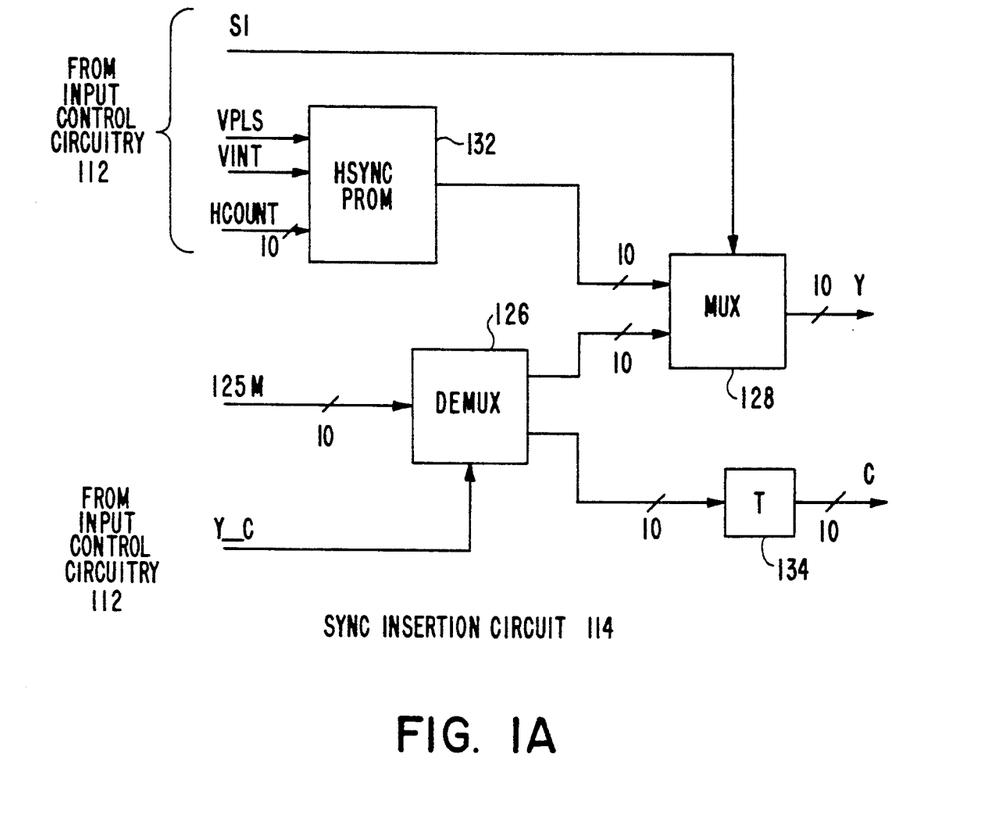
FIG. 1A is a block diagram of synchronization signal insertion circuitry suitable for use in the system shown in FIG. 1.

Exemplary sync insertion circuitry 114 is shown in FIG. 1A. In this circuit, the ten-bit 125M signal is applied to the data-input port of a demultiplexer 126 which is coupled to receive the signal Y_C as its control signal. The demultiplexer 126 provides samples of the luminance signal Y at one of its two output ports, and samples of the chrominance signal C at the other output port. The luminance samples are applied to one input port of a multiplexer 128. The other input port to the multiplexer 128 is coupled to receive a synchronization signal SYNC from a ROM 132.

The ROM 132 is addressed by values provided by the input control block 112 which are composed of the ten-bit signal HCOUNT concatenated with the single-bit signals VPLS and VINT. This address signal uniquely describes the position of the current 125M pixel on the horizontal line and the vertical field of the image. These values are applied to the address input port of the ROM 132 which, in response, produces samples representing horizontal and vertical synchronization signals. These samples are applied to the second input port of the multiplexer 128. The multiplexer 128 is controlled by the signal SI such that, when signal SI is in a logic-high state and a logic-low state, samples from the ROM 132 and the demultiplexer 126, respectively, are passed as the luminance signal Y. The circuit also includes a delay element 134 which compensates the chrominance signal for processing delays through the multiplexer 128.

Returning to FIG. 1, the signals Y and C developed by the sync-insertion circuitry 114, are applied to a frame buffer 118. Buffer 118 also receives a 13.5 MHz write clock signal W CLK and a write reset signal WR from input control logic control 112. Frame buffer 118 also receives a 14.3 MHz read clock signal R CLK and a read reset signal RR from output-control logic 124, described below. In this configuration, the frame buffer 118 acts as a large first-in, first-out (FIFO) memory. Data values representing the luminance signal Y and chrominance signal C are written into the buffer 118 synchronous with the signal W CLK and the buffer 118 is reset to its starting write address value responsive to the signal WR. Samples are read from the buffer 118 synchronous with the signal R CLK and the starting address value for reading samples from the buffer is reset by the signal RR. By controlling when the write and read address values are reset by the respective signals WR and RR, the system can implement a delay of up to one frame interval. This is desirable for studio applications where the 244M signal produced by the system may need to be delayed by as much as one frame interval to synchronize it with a video signal from another source.

The luminance and chrominance signals provided by the frame buffer 118 are applied to the interpolation filter 120 as the signals YIN and CIN respectively. Interpolation filter 120 also receives a signal SHIFT and other control signals from output-control circuitry 124. In addition, the filter 120 receives a burst signal from burst ROM 122.

As described in the above-referenced patent, the interpolation filter 120 resamples the luminance and chrominance samples stored in the frame buffer 118, converts the chrominance samples into a modulated chrominance component signal and adds the modulated chrominance signal to the luminance signal to produce the 244M output signal.

Figure 2:
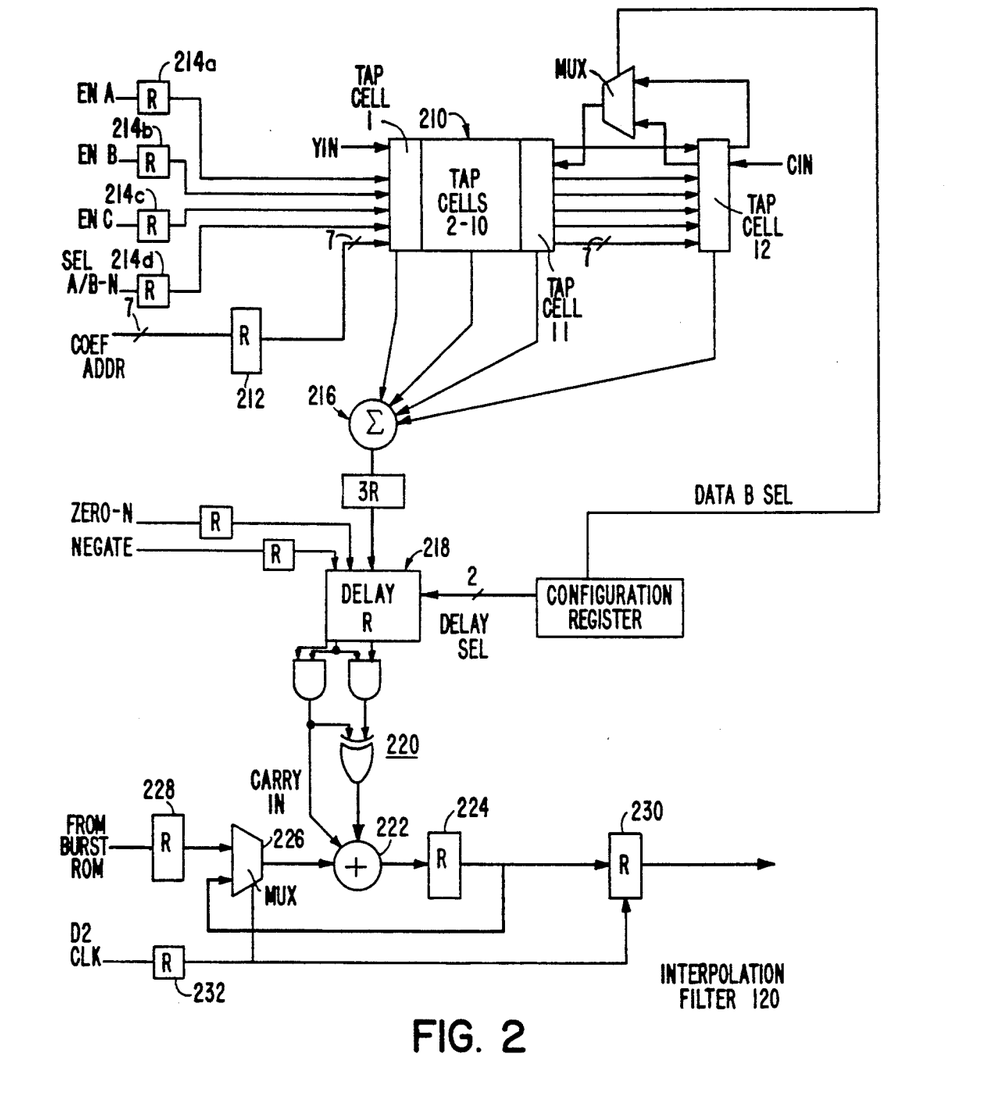
FIG. 2 is a block diagram, partly in logic diagram form, of an interpolation filter suitable for use in the system shown in FIG. 1.

FIG. 2 is a block diagram, partly in logic diagram form of an exemplary interpolation filter 120. This filter operates using a 28.63636 MHz (hereinafter 28.6 MHz) clock signal. As shown in FIG. 2, the signals YIN and CIN are applied to a bidirectional twelve-tap delay line 210. In the exemplary circuit, each tap of the delay line may be programmed with 108 coefficient values. In response to a coefficient address signal COEF ADDR provided by the output-control circuitry 124, each of the tap cells of the delay line 210 multiplies its YIN or CIN data value by the selected coefficient value. Each value of the signal COEF ADDR causes the delay line 210 to use a different set of coefficient values and, thus, to implement a different filter. The 105 interpolation filters (i.e. 35 Y filters and 70 C filters) used in this embodiment of the invention are implemented through 105 different sets of coefficients addressed by 105 different values of the signal COEF ADDR.

The YIN samples from all of the tap cells are then summed by the summing block 216. In the next sample interval, the CIN values held by the respective tap cells are multiplied by the coefficient values and summed in the summing circuit 216. Thus, the summing block 216 alternately provides samples of filtered luminance (YIN) and chrominance (CIN) signals to a programmable delay element 218. In this embodiment of the invention, the delay element 218 is set to its minimum delay value.

The samples provided by the delay element 218 may be represented by a sequence Y, I, Y, Q, Y, I . . . . These samples are applied to a selective inverting circuit 220. The circuitry 220 is controlled by a signal NEGATE provided by the output-control circuitry 124. In the exemplary embodiment of the invention, the signal NEGATE causes every other sample of the I and Q color-difference signals to be inverted so that the sequence of samples applied to the adder 222 is Y, I, Y, Q, Y, −I, Y, −Q, Y, I . . . .

The adder 222 is part of an accumulator which includes register 224 and multiplexer 226. In the exemplary embodiment of the invention, the luminance samples Y are applied to one input port of the adder 222 while a sample value which establishes a predetermined black level, is applied to the other input port from the burst ROM 122 via a register 228 and the multiplexer 226. The adder 222 produces a luminance sample Y which is stored in register 224. During the next sample interval, when one of the color-difference signals I and Q or one of the inverted color-difference signals −I and −Q is applied to the first input port of the adder 222, the multiplexer 226 is conditioned to pass the luminance sample stored in register 224 to the second input port of the adder. This results in the luminance signal being added to the color-difference signal. The summed luminance and color-difference samples are stored in the register 224 and then transferred to the register 230 synchronous with the next luminance sample being applied to the adder 222. The register 230 provides output samples which may be represented by the sequence Y+I, Y+Q, Y−I, Y−Q, Y+I . . . . This is readily recognizable by one of ordinary skill in the art as a sampled data 244M signal.

As set forth above, outside of the burst interval, the burst ROM 122 provides a signal which corrects the black level of the samples provided by the subtraction circuit 220 to produce a desired black level for the 244M signal. During the burst interval, however, the ROM 112 is conditioned by the burst-enable signal BE to provide a sampled data burst signal at a predetermined phase synchronous with the 244M clock signal, 244M CLK.

During the entire horizontal blanking interval, the samples of the color-difference signals I and Q are zero-valued. Accordingly, when a luminance sample is provided by the circuitry 220 to the adder 222 during the burst interval, the multiplexer 226 is conditioned to apply a sample of the burst signal from ROM 122 by register 228. These sample values are summed in adder 222 and then stored in register 224. During the next clock cycle, the value held in register 224 is passed by the multiplexer 226 to the adder 222. At this time, however, the circuitry 220 applies a zero-valued color-difference sample to the adder 222. Thus, the value stored in register 224 is the sum of the luminance signal value and the burst sample provided by ROM 22. This value is transferred to register 230 to provide the next sample of the 244M signal.

Figure 4:
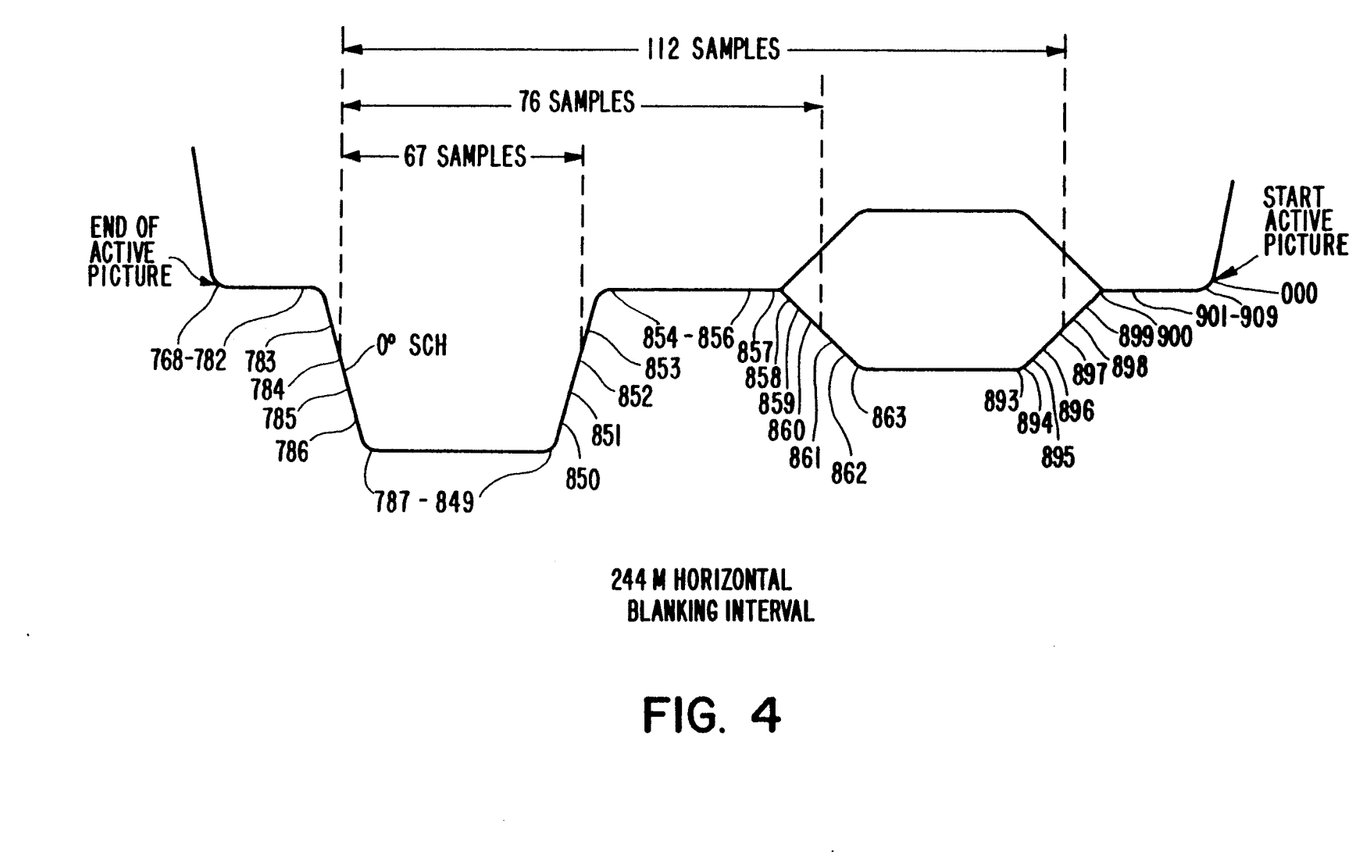
FIG. 4 is a timing diagram of the 244M horizontal blanking interval which is useful for describing the operation of the system shown in FIG. 1.

For NTSC signals and thus for 244M signals, the phase of the color-reference burst signal is fixed at a reference axis (i.e. −(B−Y)). In addition, in the 244M standard, the color-reference burst signal is assigned a fixed set of sample positions in the horizontal blanking interval. As shown in FIG. 4, the color-reference burst signal occupies sample positions 857 through 900 of the 244M horizontal blanking interval. Under the 244M standard, as shown in FIG. 4, the horizontal synchronization pulse is also assigned fixed sample locations in the horizontal blanking interval. These are positions 782 through 854. The central point of the leading edge of the horizontal sync pulse occurs at sample 784 in the 244M standard.

As set forth above, however, it may be desirable to adjust the phase of the horizontal sync pulse relative to the burst signal to prevent color errors when the 244M signal is switched with an analog signal from another source. Since the burst signal is inserted at fixed sample locations at the output of the interpolator 120, adjustment of the subcarrier-to-horizontal (SCH) phase is accomplished by resampling the horizontal sync pulse.

In the exemplary embodiment of the invention, the horizontal sync pulse does not need to be shifted by more than one sample interval to implement the SCH phase adjustments. As described below, timing adjustments of the horizontal sync pulse of less than one sample interval may be accomplished by changing the starting point in the sequence in which the 35 filters used by the interpolation filter 120 are applied to the samples of the luminance signal during the horizontal blanking interval.

Figure 3:
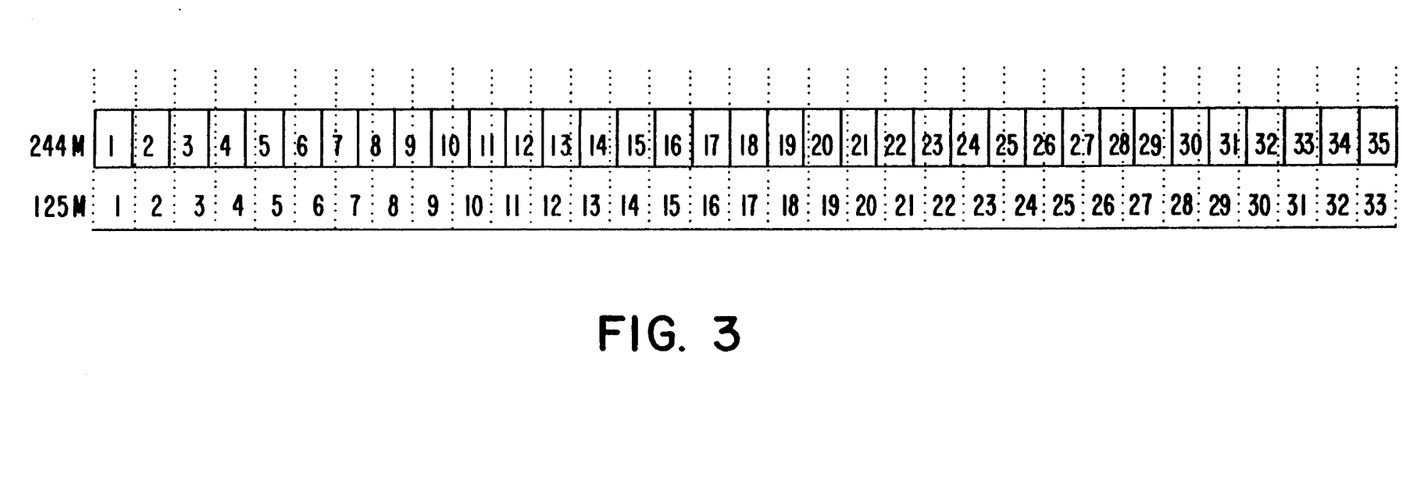
FIG. 3 is a timing diagram which illustrates the relationship between the input and output sample streams for the system shown in FIG. 1.

FIG. 3 illustrates the process of converting from a 125M Y signal having a sample rate of 13.5 MHz to a 244M Y signal having a sample rate of 14.3 MHz. As shown in FIG. 3, this conversion is achieved by resampling the 125M signal so that 33 of its samples produce 35 samples of the 244M signal. This resampling is accomplished using 35 luminance interpolation filters. Each of the 35 interpolation filters defines a fixed-phase delay between consecutive samples of the 125M signal. Thus, the various filters used by the interpolation filter 120 can be represented by a sequence $X(0), X(1), X(2), \ldots X(34)$. The filter to be used at any particular instant is determined by equation (1).

$$X(N+1) = (X(N)+33) \text{ MOD } 35 \quad (1)$$

where X(N) is the current interpolation phase, and X(N+1) is the next phase. The starting phase, X(0), of the filter determines the phase relationship between the 125M to 244M signals.

As described above, samples of luminance and chrominance signals are stored into the frame buffer 118 at a 13.5 MHz rate and are read from the frame buffer at a 14.3 MHz rate. In order to insure that, on the average, samples are not read from the buffer 118 faster than they are written into the buffer, the output-control circuitry 124 periodically inhibits the R CLK signal and the shift signal while changing the filter coefficients used to calculate the next sample value. This results in two samples of the 244M signal being calculated from the same 12 samples of the 125M signal. Equation (2) defines when new input samples are needed for the interpolation filter.

$$(X(N)+33) \text{ DIV } 35 = 1 \quad (2)$$

where DIV denotes integer division.

The output video signal can be shifted in time by simply changing the starting phase, X(0), of the filter sequence. Depending on the requested time shift, it may also be necessary to change the timing of the R CLK signal and the shift signal provided by the output-control circuitry 124. If the filter phases are represented by integers 0 to 34 and the desired time shift of the 244M signal is expressed as SCH OFFSET, where SCH_OFFSET represents the desired time shift in phase adjustment steps of 2.116 ns ($[1/33]*1/[14.31818*10^6]$), then new sample data is needed if (X(0)+SCH_OFFSET) DIV 35 is non-zero. While adjustments to the luminance signal are made in adjustment steps, the readout produced on the input and display device 117 is in nanoseconds or degrees.

In operation, the person controlling the system shown in FIG. 1 would enter a desired SCH phase-shift to the microprocessor 116 using the input and display device 117 by incrementing or decrementing a counter (not shown) which produces a value SCH_OFFSET. This phase-shift would specify a desired phase-change in the 244M output signal in increments of 5.5° (i.e. two phase adjustment steps). The value SCH_OFFSET is applied to the output-control circuitry 124 to condition that circuitry to change the starting position of the sequence of interpolation filters according to equation (3).

$$X(0) = (X(0)+\text{SCH\_OFFSET}) \text{ MOD } 35 \quad (3)$$

This adjustment causes the horizontal sync signal to be shifted by the desired phase-delay. Because the burst signal is inserted at fixed sample times at the output of the interpolation filter, this adjustment of the horizontal sync pulse effectively adjusts the relative timing between the horizontal sync pulse and the burst signal. With reference to FIG. 4, the adjustments in the filter sequence to achieve the desired SCH phase are made at sample interval 768. That is to say, at the end of the active picture interval and the beginning of the horizontal blanking interval.

In addition to adjusting the SCH phase, it may also be desirable to adjust the timing between the horizontal sync pulse and the start of the active picture. To insure that the SCH timing is not affected, it is desirable to change the video-to-horizontal timing offset after the burst interval. In the exemplary embodiment of the invention, this change is performed at a time corresponding to sample 908 as shown in FIG. 4. This sample time is chosen because it is 140 samples after the change at sample 768. Changing the phase of the 244M luminance signal at multiples of 35 samples is desirable since the luminance phase repeats every 35 samples.

The relative position of the first active video pixel and the horizontal sync pulse is changed by selectively deleting or inserting individual pixels and/or by adjusting the phase of the luminance interpolation filter as described above. The active video portion of the 125M signal is delayed or advanced by delaying or advancing the HCOUNT counter value and the write reset (WR) signal provided by the input control circuitry 112. This effectively inserts or deletes blanked samples immediately after horizontal blanking and deletes or inserts blanked samples before horizontal blanking. Since the whole sample shift is accomplished using the signal WR, the shift in the horizontal blanking interval is automatically tracked by the output control circuitry 124. Thus, no adjustment of the SCH phase is needed to account for whole sample shifts of the horizontal to active-video timing.

Alternatively, pixels may be inserted into the blanking interval at sample position 908 by selectively inhibiting the R CLK signal provided by the output controller 124. Similarly, samples may be deleted from the horizontal-blanking interval by selectively inhibiting the signal W CLK provided by the input-control circuitry 112. Any samples which are deleted at sample position 908 are desirably added at sample position 768 and, likewise, any samples which are added at sample position 908 must be deleted at sample position 768 in order to preserve the length of the horizontal blanking interval. When this method is used, the timing of the burst component is desirably adjusted for any whole sample intervals which are added to or deleted from the luminance signal at sample 768 in order to preserve the SCH phase.

In operation, a horizontal-to-video timing adjustment would be performed as follows. An operator enters a desired horizontal-position adjustment value (VID_H) in phase adjustment steps at the input device 117 to the microprocessor 116. The microprocessor then applies equation (4) to determine the number of samples to add or delete before the blanking interval (e.g. at sample position 768) and the equation (5) to determine the number of samples to add or delete after the blanking interval (i.e. at sample position 908).

$$\text{NOESe} = (X(J) + \text{VID\_H}) \text{ DIV } 35 \quad (4)$$

$$\text{NOESb} = (X(K) - \text{VID\_H}) \text{ DIV } 35 \quad (5)$$

where X(J) is the phase determined from equation (1) calculated at sample position 908 and X(K) is the phase determined from equation (1) calculated at sample position 768.

The phase adjustments to the interpolation filter 120 applied at sample positions 768 and 908 are determined using equations (6) and (7).

$$\text{SCH PHASE} = (X_{NOM} + \text{SCH\_OFFSET}) \text{ MOD } 35 \quad (6)$$

$$\text{VH\_PHASE} = (X_{NOM} + \text{SCH\_OFFSET} + \text{VID\_H}) \text{ MOD } 35 \quad (7)$$

where $X_{NOM}$ is the nominal phase when SCH and VID_H are zero.

Thus, in the exemplary embodiment of the invention, the timeshift applied at sample 768 is a combination of the number of extra samples NOESb and the phase-change SCH PHASE. The timing adjustment at sample position 908 is a combination of the number of samples NOESe and the phase-adjustment VH_PHASE.

While the invention has been described in terms of exemplary embodiments, it is contemplated that it may be practiced as outlined above within the spirit and scope of the appended claims.

What is claimed:

1. A method for automatically producing a time shift in an output signal provided by a resampling system which resamples an input sampled data signal to produce the output signal, said method comprising the steps of:
   filtering the signal using N filters in a predetermined sequence, where N is an integer greater than 1 and each of said N filters provides interpolated samples representing respectively different sampling phases within a sample interval of the input sampled data signal
   receiving a desired time shift value;
   determining a sampling phase which corresponds to the desired time shift;
   changing said predetermined sequence to apply the one of said N filters which corresponds to the determined sampling phase as the first filter in the sequence.

2. A method for automatically producing a time shift in an output signal provided by a resampling system which resamples an input sampled data signal by filtering the signal using N filters in a predetermined sequence to produce the output signal, where N is an integer greater than 1 and each of said N filters provides interpolated samples representing respectively different sampling phases within a sample interval of the input sampled data signal, said method comprising the steps of:
   receiving a desired time shift value;
   determining a sampling phase which corresponds to the desired time shift including the steps of:
      dividing said desired time shift value by an amount of time between successive ones of said N sampling phases to produce a resultant value;
      adding the resultant value to a value representing the starting phase of said predetermined sequence to produce a sum value; and
      dividing said sum value modulo N to produce the determined sampling phase; and
   changing said predetermined sequence to apply the one of said N filters which corresponds to the determined sampling phase as the first filter in the sequence.

3. A method according to claim 2, wherein said time shift is to be produced between a portion of said output signal corresponding to a first predetermined one of the samples of said sampled data output signal and a signal to be added to the sampled data output signal at a second predetermined one of the samples of said sampled data output signal, further including the step of effecting said change in the predetermined sequence at a time corresponding to a third predetermined one of the samples of said sampled data output signal occurring prior to the first predetermined one of said samples.

4. A method according to claim 3, wherein a further time shift is to be produced between the portion of said output signal corresponding to the first predetermined one of the samples of said sampled data output signal and a further portion of said output signal, occurring at a time corresponding to a fourth predetermined one of said samples, after said second predetermined one of said samples, said method further including the steps of:
   receiving said further time shift value;
   determining a sampling phase which corresponds to the further time shift value;
   changing said predetermined sequence to apply the one of said N filters which corresponds to the determined sampling phase as the first filter in the sequence at a time corresponding to a fifth predetermined one of the samples of said sampled data output signal occurring after the second predetermined one of said samples and before the fourth predetermined one of the samples.

5. A method according to claim 4, wherein said sampled data output signal is a video signal having a horizontal blanking interval which includes a horizontal synchronizing signal interval and a color reference burst interval, and the first predetermined one on said samples corresponds to the start of said horizontal synchronizing signal interval, the second predetermined one of said samples corresponds to the start of said color reference burst interval, the third predetermined one of said samples corresponds to the start of said horizontal blanking interval and the fourth predetermined one of said samples corresponds to the end of said horizontal blanking interval.

6. Apparatus comprising:
   input means for receiving a sampled data input signal;
   an interpolation filter, coupled to receive the input signal, said filter being programmed to filter the sampled data input signal using a predetermined sequence of N filter characteristics, each of said N filter characteristics being defined by a respectively different group of M distinct filter coefficient values where M and N are integers greater than 1, and where each of the N filter characteristics corresponds to a respectively different interpolated sample position, the interpolation filter generating a sampled data output signal which represents the input signal and which has a sample rate that differs from said input signal;
   means for receiving a desired output time shift value;
   means for determining a next interpolated sample position which corresponds to the desired time shift with respect to the interpolated sample position corresponding to filter characteristic currently in use;
   means for changing said predetermined sequence to apply the one of said N filter characteristics which corresponds to the determined next interpolation position in the predetermined sequence.

7. Apparatus comprising
   input means for receiving a sampled data input signal;
   an interpolation filter, coupled to receive the input signal and including a programmable filter programmed to filter the sampled data input signal using a predetermined sequence of N filter characteristics where N is an integer greater than 1, each of the filter characteristics corresponding to a respectively different interpolated sample position, to generate a sampled data output signal which represents the input signal and has a sample rate which differs from said input signal;

means for receiving a desired time shift value;

means for determining a next interpolated sample position which corresponds to the desired time shift with respect to the interpolated sample position which corresponds to filter characteristic that is currently in use including:

means for dividing said desired time shift value by an amount of time between successive ones of said N interpolated sample positions to produce a resultant value;

means for adding the resultant value to a value representing the current interpolation position of said predetermined sequence to produce a sum value; and  means for dividing said sum value modulo N to produce the a value representing the next interpolation position; and means for changing said predetermined sequence to apply the one of said N filter characteristics which corresponds to the determined next interpolation position in the predetermined sequence.

8. Apparatus according to claim 7, wherein:

said time shift is to be produced between a portion of said output signal corresponding to a first predetermined one of the samples of said sampled data output signal and a signal to be added to the output sampled data output signal at a second predetermined one of the samples of said sampled data output signal; and said apparatus further includes means for effecting said change in the predetermined sequence at a time corresponding to a third predetermined one of the samples of said sampled data output signal occurring prior to the first predetermined one of said samples.

9. Apparatus corresponding to claim 8, further including:

means for receiving a further time shift value to be produced between the portion of said output signal corresponding to the first predetermined one of the samples of said sampled data output signal and a further portion of said output signal, occurring at a time corresponding to a fourth predetermined one of said samples after said second predetermined one of said samples;

means for determining which one of said interpolation positions corresponds to the further time shift value with respect to the interpolation position of the filter characteristic currently being used;

means for changing said predetermined sequence to apply the one of said N filter characteristics which corresponds to the determined interpolation position as a next filter characteristic in the sequence at a time corresponding to a fifth predetermined one of the samples of said sampled data output signal occurring after the second predetermined one of said samples and before the fourth predetermined one of the samples.

10. Apparatus according to claim 9, wherein said sampled data output signal is a video signal having a horizontal blanking interval which includes a horizontal synchronizing signal interval and a color reference burst interval, and the first predetermined one on said samples corresponds to the start of said horizontal synchronizing signal interval, the second predetermined one of said samples corresponds to the start of said color reference burst interval, the third predetermined one of said samples corresponds to the start of said horizontal blanking interval and the fourth predetermined one of said samples corresponds to the end of said horizontal blanking interval.

* * * * *